United States Patent Office 3,381,214
Patented Apr. 30, 1968

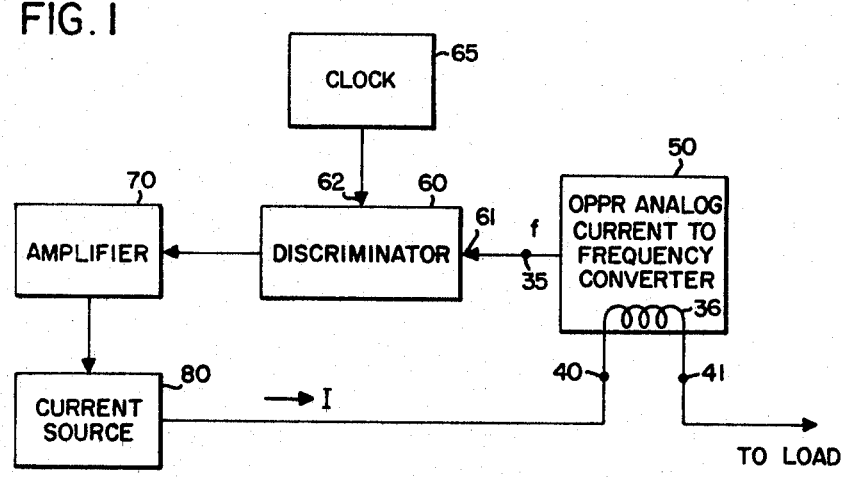
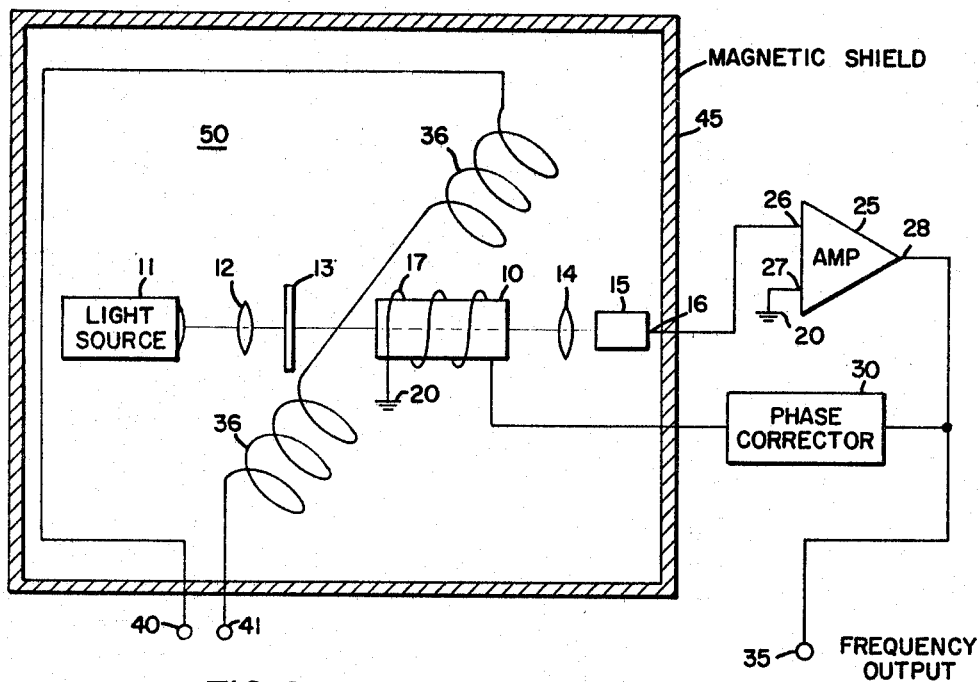

3,381,214
CONSTANT CURRENT SOURCE EMPLOYING A PARAMAGNETIC RESONANCE CURRENT TO FREQUENCY CONVERTER
Kenneth W. Exworthy, Minneapolis, Minn., assignor to Honeywell Inc., Minneapolis, Minn., a corporation of Delaware
Filed Dec. 23, 1965, Ser. No. 515,983
8 Claims. (Cl. 324—.5)

The present invention pertains to current control means. More particularly the present invention pertains to means for regulating and controlling the amplitude of a current signal to an accuracy which is within very small tolerance limits of a particular desired value.

The apparatus here described takes advantage of the analog current to frequency converter of the type described and claimed in co-pending application Ser. No. 511,851, filed on Dec. 6, 1965, in the name of Harold D. West and assigned to the assignee of the present invention. There is shown an optically pumped paramagnetic resonance analog current to frequency converter with an input to receive an electric signal and an output whereas appears a generally sinusoidal signal whose frequency is a function of the input electric signal magnitude. It has been found that the output frequency is an extremely accurate indication of the input electric current magnitude. The present invention utilizes this feature for the purpose of controlling the magnitude of the output current of a current source and thus provides for an accurate current reference standard.

Each frequency at the output of the paramagnetic resonance converter corresponds to a particular amplitude of the current at its input. A clock is provided in the present apparatus to supply a reference signal whose frequency corresponds exactly to the frequency which the output signal of the converter would possess if the input current were of a desired amplitude. The frequency of the signal from the clock is compared to the frequency of the signal from the converter and the difference signal is used to control the current source until the two frequencies match, indicating that the current output of the current source is of the desired magnitude.

It is therefore an object of the present invention to provide a means for accurately controlling the amplitude of a current.

A further object of the present invention is to provide an accurate current reference standard.

These and further objects will become apparent to those skilled in the art upon consideration of the accompanying specification, claims, and drawings of which:

FIGURE 1 is a block diagram representation of the apparatus of the present invention; and FIGURE 2 is a schematic diagram of the optically pumped paramagnetic analog current to frequency converter used in the apparatus of FIGURE 1.

Referring now to FIGURE 1, an optically pumped paramagnetic resonance analog current to frequency converter 50 is shown having an input winding 36 with end terminals 40 and 41 and is further shown having an output 35. Output 35 of converter 50 is connected to an input 61 of a discriminator 60. Discriminator 60 further has a second input 62 connected to receive the signal from the output of a clock 65. The output of discriminator 60 is connected to the input of an amplifier 70. Amplifier 70 has its output connected to a current source 80 to control the current output amplitude of source 80. The output of current source 80 is connected to end terminal 40 of winding 36 in converter 50. The other end 41 of winding 36 is available for connection to a load which requires an accurately regulated current.

The optically pumped paramagnetic resonance analog current to frequency converter 50, the details of which are shown in FIGURE 2, makes use of the behavior of the magnetic moments of a collection of elemental atoms in an external magnetic field. When exposed to the field, these magnetic moments precess about the field direction with a frequency proportional to the magnitude of the field and related to it through a constant determined by unvarying characteristics of the type of elemental atoms in the sample. By using a beam of light to induce energy transitions in the atoms, the majority may be "pumped" into one desired metastable energy state. This process reduces conflicting effects and increases the number of atoms contributing to the resonance signal.

There are a large number of elements that will respond in a suitable manner to the above conditions, but the best performance is generally obtained from the alkali metals, especially sodium, rubidium, and cesium.

The mechanization of the device is illustrated in FIGURE 2. An absorption cell 10 is shown containing a sample of elemental atoms of an alkali metal in vapor form. A light source 11 is provided to produce a beam of light with electromagnetic radiation at resonance frequencies of the alkali atoms in absorption cell 10. A lens 12 is provided to direct the beam of light from source 11 through a filter and polarizer 13 to absorption cell 10. The function of filter and polarizer 13 is to remove all radiation but of the frequency of interest and to correctly polarize the light to excite the proper energy transition in the alkali atoms in absorption cell 10. The light is polarized to eliminate excitation of conflicting energy transitions. By proper design of the absorption cell, however, it is possible to obtain operation of the oscillator without polarizing the pumping light beam.

A lens 14 is provided to direct the light transmitted through absorption cell 10 onto an optical detector 15. Optical detector 15 has an output 16 at which appears an electrical signal indicative of the quantity of light received by detector 15. In the apparatus of FIGURE 2 a single source of light is shown to perform both the pumping and the detection functions. However, for optimum operational efficiency, a separate source of light may be provided for each of the two functions. In such an arrangement the pumping beam will be co-linear with the input magnetic field, and perpendicular to the readout beam.

Output 16 of optical detector 15 is connected to an input 26 of an amplifier 25. Amplifier 25 has a second input 27 connected to a ground terminal 20, and further has an output 28. Ouptut 28 of amplifier 25 is connected to the input of a phase shift network 30 and also to an output terminal 35.

A winding 17 is wound about absorption cell 10 and is oriented in such a way that the magnetic field resulting from a current through winding 17 is co-linear with the light beam from light source 11. Winding 17 has one of its ends connected to ground terminal 20 and has its other end connected to the output of phase shift network 30. A second winding 36 is positioned about absorption cell 10 in such a manner that the magnetic field resulting from a current through winding 36 lies along an axis through absorption cell 10, but at an angle to the light beam from light source 11. For optimum operation, the angle between the axis of windings 17 and 36 should be 45 degrees. The two ends of winding 36 are connected to input terminals 40 and 41 respectively. The function of winding 36 is to receive an electric current and to produce a magnetic field along the axis of winding 36. Since only a small magnetic field is needed for this type of resonance (approximately .01 to 10 gauss), the use of air core coils is feasible. It is, therefore, not necessary to use ferro-magnetic materials which with their inherent hysteresis would naturally degrade the converter performance. The precession frequency of the sample atoms in cell 10 varies with the strength of the magnetic field created by winding 36.

The purpose of winding 17 is to induce coherent precession of the atomic moments aligned by the action of the pumping beam from light source 11 and the magnetic field established by the current through winding 36. Since the allowed precessional frequencies are discrete for given value of magnetic field and given sample element, the alternating magnetic field of winding 17 will act on the aligned atomic moments only when its frequency corresponds to an allowed precessional frequency.

When conditions for resonance exist, the alternating magnetic field of winding 17 affects a number of atoms in the resonance condition in such a way as to vary the transmissivity of the absorption cell to the pumping light beam. Transmissivity varies sinusodially at the resonance frequency, modulating the intensity of the light at this frequency. Lens 14 focuses the light beam on photodetector 15 after it passes through absorption cell 10. Photodetector 15 produces a DC output signal modulated at the resonance frequency when the signal in winding 17 is at this frequency, and an unmodulated DC signal when the signal in winding 17 is at any different frequency.

Winding 17 surrounding absorption cell 10 receives the signal from phase shift network 30, which induces modulation of the light beam when it is at the resonance frequency of the alkali atoms as determined by the strength of the field created by current through winding 36. These modulations are detected by photodiode 16, amplified in amplifier 25, shifted in phase by 90 degrees by phase shift network 30, and applied to drive winding 17 with radio frequency alternating current. An oscillator is thus formed which oscillates only at the resonant frequency of the alkali atoms in the absorption cell since neglible coupling exists between the input and the output at any other frequency.

Photodetector 15 may be a high resistivity silicon photodiode of a generally available type. Amplifier 25 is designed to allow diode 15 the capability of detecting light modulations in the range of medium radio frequencies.

A total of 90 degrees phase shift is required in the oscillator loop because spatial phasing of the R-F magnetic field and the modulation of the light by the atomic moments is 90 degrees. Phase corrector 30 provides appropriate phase shift such that the total phase shift in the loop will be 90 degrees.

The resonant frequency of the atoms in cell 10 is directly proportional to magnetic field established by winding 36 which in turn is directly proportional to the current through the winding. The frequency of the output signal at the output terminal 35 is, therefore, a direct indication of the magnitude of the current input to terminals 40 and 41.

A magnetic field shield 45 is provided to remove the effects of external magnetic fields.

In FIGURE 1, the quantity to be controlled is the current delivered from current source 80 to the load. The current being delivered by source 80 to the load is passed through winding 36 of converter 50. As pointed out with reference to FIGURE 2, the output signal appearing at output 35 of converter 50 is a time varying signal whose frequency is directly proportional to the amplitude of the current through winding 36. Clock 65 provides a reference signal whose frequency corresponds exactly to the frequency which the output signal of converter 50 would have if the current from source 80 were of a desired amplitude. The frequencies of the two signals are compared in discriminator 60 and an output is provided by discriminator 60 which is indicative of the difference of the two frequencies. This output signal is appled to amplifier 70 where it is amplified and applied to current source 80 to control the amplitude of the current output. Discriminator 60 continues to provide an output until the amplitude of the current from current source 80 is adjusted to a value which will produce a frequency at output 35 of converter 50 exactly equal to the frequency of clock 65.

Many variations and embodiments are possible within the spirit of this invention. It is, therefore, understood that the specific embodiment of my invention shown here is for the purpose of illustration only, and that my invention is limited only by the scope of the appended claims.

I claim:

1. Current control apparatus comprising:
   variable current generating means having an input and an output;
   an optically pumped paramagnetic resonance analog current to frequency converter having an input connected to the output of said current generating means, and having an output at which appears an alternating signal whose frequency is proportional to the magnitude of said current at the output of said current generating means;
   frequency reference means for providing an alternating reference signal whose frequency corresponds to a desired frequency of the signal at the output of said converter;
   discriminator means having a first and a second input connected to receive the signals from said converter and said frequency reference means respectively and having an output for providing a signal indicative of the frequency difference of the signals at said two outputs;
   means connecting the output of said discriminator means to the input of said variable current generating means to control the current amplitude of said generating means.

2. Apparatus according to claim 1, wherein said analog current to frequency converter includes:
   an input and an output;
   an absorption cell containing a sample of elemental atoms;
   a first and a second winding about said absorption cell along a first and a second axis respectively, said axes being at an angle to each other;
   radiation means for producing electro-magnetic radiation energy at a resonance frequency of the elemental atoms in said absorption cell;
   means for directing said radiation energy from said radiation means to said absorption cell with at least a component of said radiation energy being directed along each of said first and second axes;
   a radiation detector means for detecting the radiation being transmitted through said absorption cell along said first axis and to provide at its output an electrical signal indicative thereof;
   circuit means, including amplifying means, connecting the output of said detector means to said first winding and to said output; and
   means connecting said input to said second winding, whereby the frequency of the signal at said output is proportional to the magnitude of the current at said input.

3. Apparatus according to claim 2 wherein separate means are provided for producing electro-magnetic radiation along said first and said second axes respectively.

4. Apparatus according to claim 2 wherein the electromagnetic radiation energy produced by said radiation means is in the optically visible frequency spectrum.

5. An accurate current reference standard comprising:
   a variable direct current generating means having an input and an output, the magnitude of the current at said output being controllable by a signal at its input;
   a constant frequency reference means having an output;
   an optically pumped, paramagnetic resonance analog current to frequency converter having an input connected to receive a signal indicative of the current amplitude at the output of said current generating means, and having an output at which appears a time varying signal whose frequency is a function of said current amplitude;

comparing means having first and second inputs connected to receive the signals from said frequency reference means and said converter and adapted to provide at its output an output signal indicative of the difference in the frequency of the two signals at its inputs; and means connecting the output of said comparing means to the input of said variable direct current generating means.

6. Apparatus according to claim 5, wherein said analog current to frequency converter includes:

an input and an output;

an absorption cell containing a sample of elemental atoms;

a first and a second winding about said absorption cell along a first and a second axis respectively, said axes being at an angle to each other;

radiation means for producing electro-magnetic radiation energy at a resonance frequency of the elemental atoms in said absorption cell;

means for directing said radiation energy from said radiation means to said absorption cell with at least a component of said radiation energy being directed along each of said first and second axes;

a radiation detector means for detecting the radiation being transmitted through said absorption cell along said first axis and to provide at its output an electrical signal indicative thereof;

circuit means, including amplifying means, connecting the output of said detector means to said first winding and to said output; and means connecting said input to said second winding, whereby the frequency of the signal at said output is proportional to the magnitude of the current at said input.

7. Apparatus according to claim 6 wherein separate means are provided for producing electro-magnetic radiation along said first and said second axes respectively.

8. Apparatus according to claim 6 wherein the electromagnetic radiation energy produced by said radiation means is in the optically visible frequency spectrum.

References Cited

UNITED STATES PATENTS

| | | | |
|---|---|---|---|
| 3,014,210 | 12/1961 | Beaumont | 324—.5 |
| 3,150,313 | 9/1964 | Dehmelt | 324—.5 |
| 3,167,706 | 1/1965 | Doyle | 324—.5 |
| 3,172,055 | 3/1965 | Abrahamson | 324—.5 |
| 3,205,490 | 9/1965 | Francisco | 331—94 |
| 3,257,608 | 6/1966 | Bell | 324—.5 |
| 3,259,735 | 7/1966 | Senstad | 324—.5 |

RUDOLPH V. ROLINEC, *Primary Examiner.*

M. J. LYNCH, *Assistant Examiner.*